US008489222B2

(12) United States Patent
Kim et al.

(10) Patent No.: US 8,489,222 B2
(45) Date of Patent: Jul. 16, 2013

(54) MACHINE AND METHOD FOR GRINDING SPACER GRID OF NUCLEAR FUEL ASSEMBLY

(75) Inventors: Chang Kug Kim, Daejon (KR); Deuk Yeon Kim, Daejon (KR); Jung Hwan Hong, Daejon (KR); Hang Rae Kim, Daejon (KR); Cheol Ho Choi, Daejon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 430 days.

(21) Appl. No.: 12/857,530

(22) Filed: Aug. 16, 2010

(65) Prior Publication Data
US 2011/0288675 A1 Nov. 24, 2011

(30) Foreign Application Priority Data

May 20, 2010 (KR) .................. 10-2010-0047368
May 20, 2010 (KR) .................. 10-2010-0047370

(51) Int. Cl.
*G06F 19/00* (2011.01)
(52) U.S. Cl.
USPC .................. 700/164; 451/443; 451/463
(58) Field of Classification Search
USPC .................. 700/164; 451/443, 463
See application file for complete search history.

(56) References Cited

U.S. PATENT DOCUMENTS

| 4,774,752 | A | * | 10/1988 | Cooper, Jr. et al. | 29/426.4 |
|---|---|---|---|---|---|
| 5,377,238 | A | * | 12/1994 | Gebelin et al. | 376/260 |
| 5,825,655 | A | * | 10/1998 | Nakagawa et al. | 700/175 |
| 5,917,875 | A | * | 6/1999 | Tuzio et al. | 376/245 |
| 6,038,489 | A | * | 3/2000 | Pickles et al. | 700/164 |
| 2010/0189533 | A1 | * | 7/2010 | Segawa et al. | 414/222.01 |

* cited by examiner

*Primary Examiner* — Mohammad Ali
*Assistant Examiner* — Nathan Laughlin
(74) *Attorney, Agent, or Firm* — Rabin & Berdo, P.C.

(57) ABSTRACT

A machine and a method for grinding a spacer grid of a nuclear fuel assembly. The machine includes a spacer grid holding unit, a first rectangular coordinates robot for grinding an outer surface of the spacer grid, a second rectangular coordinates robot for grinding a corner of the spacer grid, and a control unit. The spacer grid holding unit includes a holding jig onto which the spacer grid is seated and held, and a rotary index table which is coupled to the holding jig to rotate the holding jig. The first and second rectangular coordinates robots are provided at predetermined positions adjacent to the spacer grid holding unit. The control unit controls the spacer grid holding unit, the first and second rectangular coordinates robots and all programs required to conduct the operation for grinding the spacer grid.

9 Claims, 8 Drawing Sheets

MACHINE AND METHOD FOR GRINDING SPACER GRID OF NUCLEAR FUEL ASSEMBLY

CROSS-REFERENCE TO RELATED APPLICATIONS

The present application claims priority under 35 U.S.C. 119 to Korean Patent Application No. 10-2010-0047368, filed on May 20, 2010, and Korean Patent Application No. 10-2010-0047370, filed on May 20, 2010, the disclosures of which are expressly incorporated by reference herein in their entirety.

BACKGROUND OF THE INVENTION

1. Field of the Invention

The present invention relates generally to a machine used in a process of manufacturing an Inconel spacer grid which is one of the critical parts of a nuclear fuel assembly and, more particularly, to a machine for automatically grinding the outer surface or corner of the spacer grid to eliminate taps and remnants of filler metal which are formed on the outer surface or corner of the spacer grid.

2. Description of the Related Art

As is well known to those skilled in the art, a nuclear fuel assembly is an assembly for nuclear fuel elements and is configured such that, when the nuclear fuel elements are loaded into or extracted from a nuclear reactor, they are integrally handled as a single body rather than as individual components. For example, in a nuclear fuel assembly for a light-water reactor, a fuel rod is manufactured by sintering uranium oxide into a pellet shape and sealing the uranium oxide in a hollow rod which is made of a Zircaloy alloy and which has a length of about 4 m. A plurality of fuel rods, for example, in the case of a boiling water reactor, about sixty fuel rods, and in the case of a pressurized water reactor, about two hundred and thirty fuel rods, is formed into a square grid-shaped bundle. Support plates having holes through which a coolant passes are respectively mounted to the upper and lower ends of the bundle. A spacer grid is provided in a medial portion of the bundle to maintain distances among the fuel rods constant.

In the nuclear fuel assembly, a structure which serves as a frame into which fuel rods are inserted is called a frame body. The frame body includes a top nozzle, a bottom nozzle, a guide thimble, a measurement tube and spacer grids. These elements are assembled together by welding or a mechanical coupling method. As such, the frame body of the nuclear fuel assembly functions to maintain distances among the fuel rods constant and support the fuel rods. In addition, the frame body forms the basis of the mechanical structure of the nuclear fuel assembly.

In the frame body, each Inconel spacer grid is manufactured by assembling outer straps with inner straps into a grid shape and by brazing using filler metal and is processed by heat treatment. Therefore, the spacer grid is easily deformed during the manufacturing process, thus making it difficult to meet the standardized shape. Furthermore, the spacer grids are provided on the upper and lower portions of the frame body and thus support the entire frame body. In addition, the spacer grids function to maintain distances between nuclear fuel assemblies in the nuclear reactor. Therefore, the outer measurements of the spacer grid must be precise. Also, protrusions must not be present on the outer surface of the spacer grid after an operation of grinding is completed. When conducting the grinding, a depth to which the spacer grid is ground must be as shallow as possible to prevent the brazed portions from being damaged.

To meet the above-mentioned requirements, the Inconel spacer grid has a very complex shape. Hence, it is very difficult to grind the spacer grid using an automated machine. However, because the spacer grid serves a very important role in the nuclear reactor, it must be very precisely ground.

Accordingly, the operation of grinding the outer surface of the spacer grid requires very high precision and has been conducted by a manual method to ensure the quality of the product. However, the manual operation requires much time. Furthermore, taking into account the demand of Inconel spacer grids, improvement in productivity is required.

As such, in conventional arts, the grinding operation has been conducted by a manual method, because the shape of the Inconel spacer grid is not standardized and it is thus not easy to grind it using an automated machine. For example, in a conventional art, target portions to be ground were processed one by one using a hand grinder. However, in the case of such a conventional grinding method, there is a probability that a worker will contract a musculoskeletal disease. Furthermore, working surroundings are poor because of noise of the hand grinder and the dust that is generated when grinding, so that at least two workers should work in shifts of four hours each day.

Moreover, intensity of work is very high, reducing productivity. The manual work cannot make the ground portions uniform.

Therefore, automation of the grinding operation is required to improve the quality of the spacer grid, the productivity and the work surroundings as well as to prevent a worker from contracting a musculoskeletal disease.

SUMMARY OF THE INVENTION

Accordingly, the present invention has been made keeping in mind the above problems occurring in the prior art, and an object of the present invention is to provide a machine for automatically grinding an outer surface or corner of a spacer grid of a nuclear fuel assembly in a process of manufacturing the spacer grid.

Another object of the present invention is to provide a method of automatically grinding the outer surface or corner of the spacer grid of the nuclear fuel assembly in the process of manufacturing the spacer grid.

In order to accomplish the above object, in one aspect, the present invention provides a machine for grinding a spacer grid of a nuclear fuel assembly, including: a spacer grid holding unit having a holding jig onto which the spacer grid is seated and held, and a rotary index table coupled to a lower end of the holding jig, the rotary index table rotating the holding jig; a first rectangular coordinates robot for grinding an outer surface of the spacer grid, the first rectangular coordinates robot being provided at a predetermined position adjacent to the spacer grid holding unit; a second rectangular coordinates robot for grinding a corner of the spacer grid, the second rectangular coordinates robot being provided at a predetermined position adjacent to the spacer grid holding unit; and a control unit controlling the spacer grid holding unit, the first rectangular coordinates robot, the second rectangular coordinates robot, and all programs required to conduct an operation of grinding the spacer grid.

In another aspect, the present invention provides a method of grinding an outer surface of a spacer grid of a nuclear fuel assembly, including: mounting the spacer grid to a holding jig to conduct a grinding operation; holding the spacer grid using holders by operating an upper cylinder and a side cylinder, the holders being respectively coupled to the upper cylinder and the side cylinder; determining a height of a target portion to be ground and an inclination of the target portion by measuring heights of opposite ends of an upper surface of an outer strap of the spacer grid using a sensor; determining a grinding depth and an inclination with respect to a grinding direction by measuring depths of four measuring points of each of four side cells that are respectively provided on upper and lower portions of opposite ends of the spacer grid and by measuring depths of two measuring points of each of a plurality of medial cells that are disposed in a medial portion of the spacer grid, the two measuring points corresponding to a grinding start point and a grinding end point; grinding the outer surface of the spacer grid in response to at least one of the height of the target portion of the spacer grid, the inclination of the outer surface of the spacer grid and the grinding depth; and rotating the spacer grid after the grinding is completed, so that another outer surface of the spacer grid is disposed at a position at which the outer surface of the spacer grid is ground, and repeating the determining of the height of the target portion, the determining of the grinding depth and the inclination with respect to the grinding direction, the grinding, and then repeating the rotating, the determining of the height, the determining of the grinding depth and the inclination and the grinding until all four surfaces of the spacer grid are ground.

In another aspect, the present invention provides a method of grinding a corner of a spacer grid of a nuclear fuel assembly, including: mounting the spacer grid to a holding jig to conduct a grinding operation; holding the spacer grid using holders by operating an upper cylinder and a side cylinder, the holders being respectively coupled to the upper cylinder and the side cylinder; grinding an upper portion of a corner of the spacer grid, the grinding of the upper portion comprising: measuring a height of the upper end of the corner of the spacer grid using a sensor module; and repetitively grinding the upper portion of the corner to a measured depth along a measured inclination by a preset depth each time using a rectangular coordinates robot for grinding a corner; grinding a lower portion of the corner of the spacer grid, the grinding of the lower portion comprising: moving the rectangular coordinates robot towards the lower portion of the corner by a selected distance, and repetitively grinding the lower portion of the corner to a measured depth by a preset depth each time using the rectangular coordinates robot along the inclination determined in the grinding of the upper portion of the corner; and rotating the spacer grid after the grinding of the upper and lower portions of one corner of the spacer grid is completed, and repeating the grinding of the upper portion of the corner and the grinding of the lower portion of the corner, and then repeating the rotating of the spacer grid, the grinding of the upper portion of the corner and the grinding of the lower portion of the corner until all corners of the spacer grid are ground.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of a machine for grinding a spacer grid of a nuclear fuel assembly according to the present invention will be described in detail with reference to the attached drawings.

The terms and words used in the specification and claims must be understood to indicate concepts selected by the inventor as the best method for illustrating the present invention, and must be interpreted as having meanings and concepts adapted to the scope and spirit of the present invention for understanding the technology of the present invention.

In the following description, when it is determined that the detailed description for the conventional function and conventional structure confuses the gist of the present invention, the description may be omitted.

Figure 1:
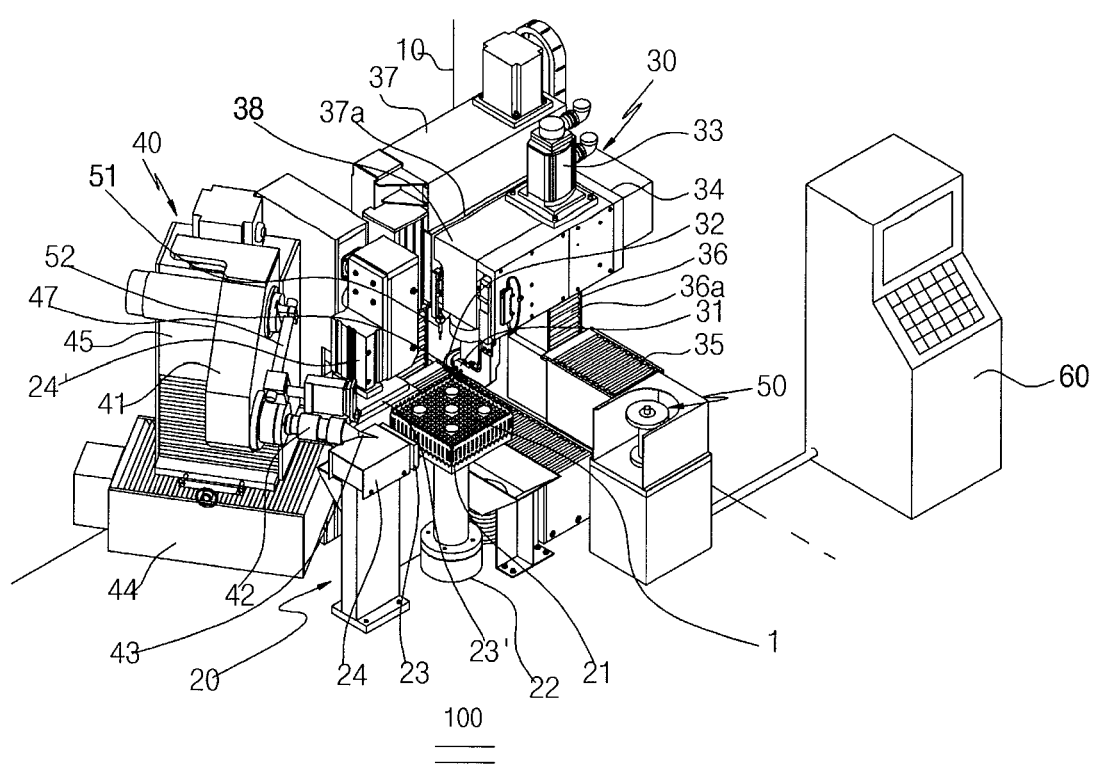
FIG. 1 is a perspective view of a machine for grinding a spacer grid of a nuclear fuel assembly, according to an embodiment of the present invention.
Figure 2:
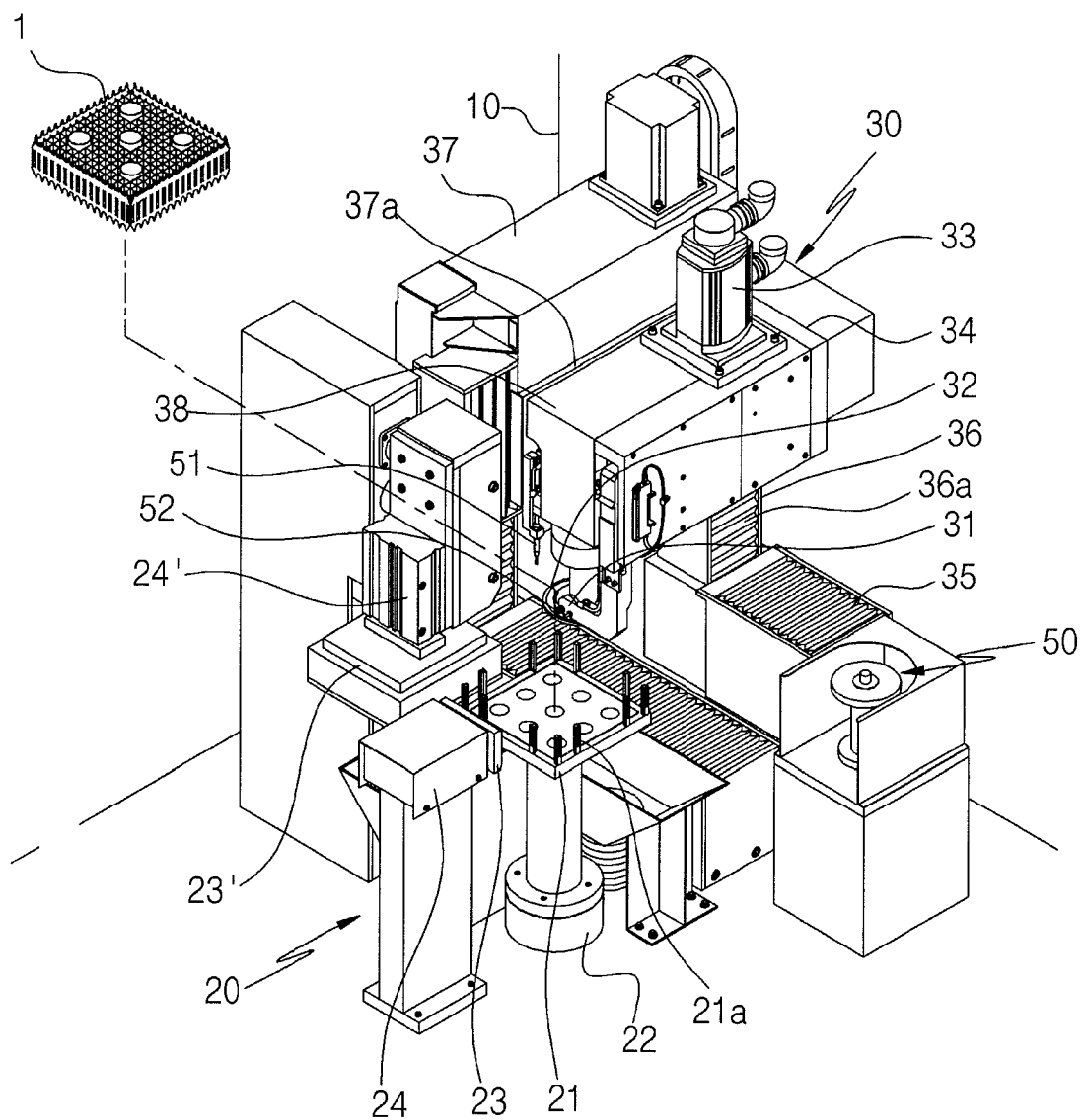
FIG. 2 is an exploded perspective view of a rectangular coordinates robot of FIG. 1 for grinding an outer surface of the spacer grid.
Figure 3:
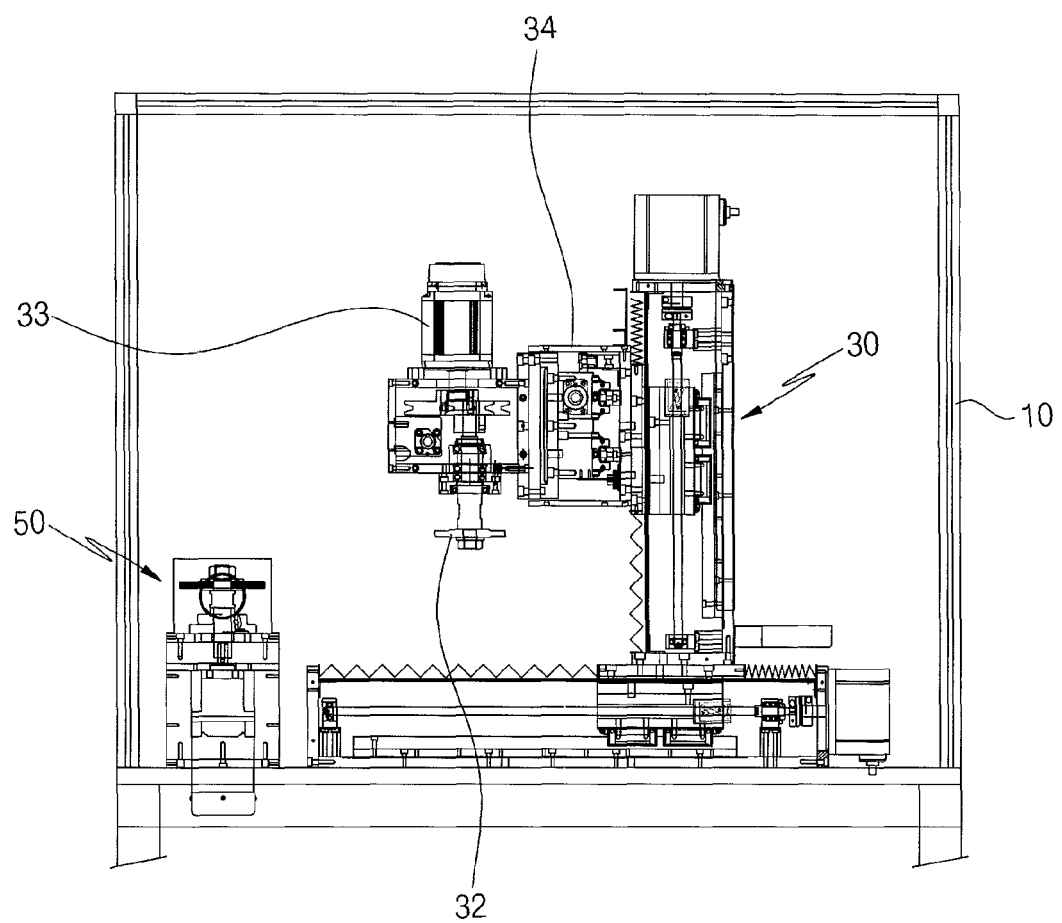
FIG. 3 is a front sectional view of the rectangular coordinates robot of FIG. 2.
Figure 4:
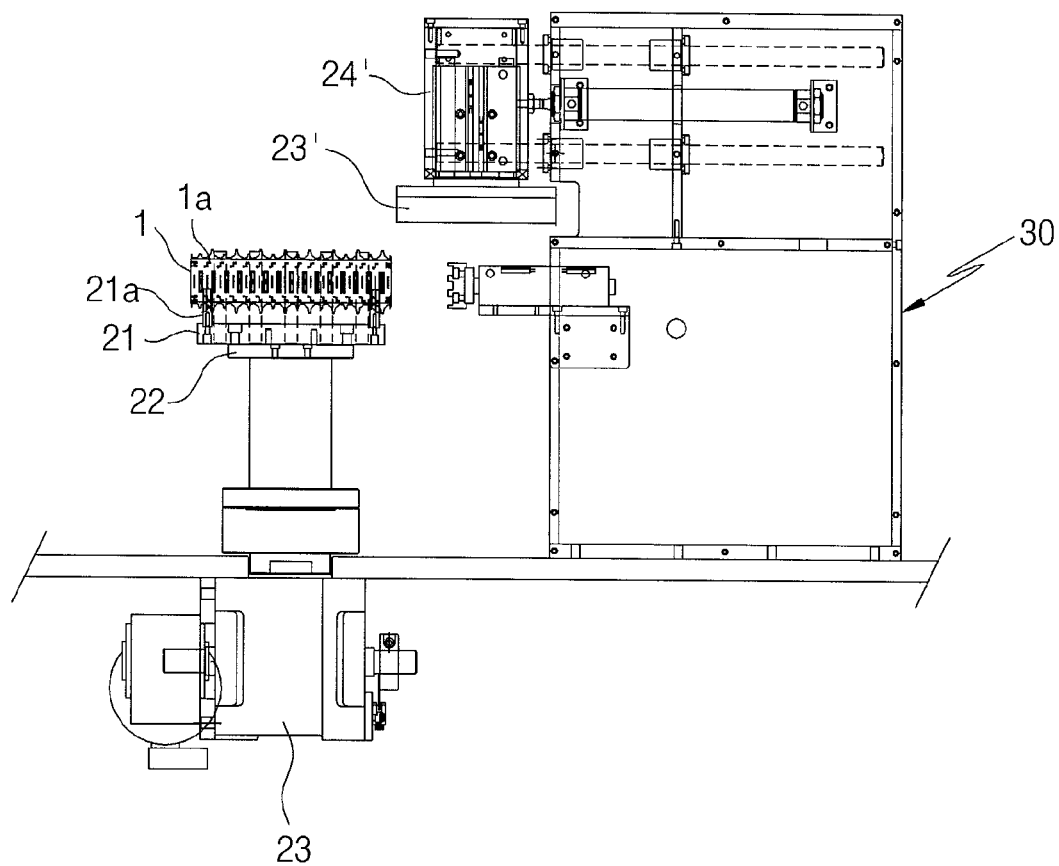
FIG. 4 is a lateral sectional view of the rectangular coordinates robot of FIG. 2.

FIG. 1 is a perspective view of a machine 100 for grinding a spacer grid of a nuclear fuel assembly, according to an embodiment of the present invention. FIG. 2 is an exploded perspective view of a rectangular coordinates robot 30 of FIG. 1 for grinding an outer surface of the spacer grid 1. FIG. 3 is a front sectional view of the rectangular coordinates robot 30 of FIG. 2. FIG. 4 is a lateral sectional view of the rectangular coordinates robot 30 of FIG. 2.

As shown in FIG. 1, the machine 100 for grinding the spacer grid 1 of a nuclear fuel assembly according to the preferred embodiment of the present invention includes an outer frame 10, a spacer grid holding unit 20, the rectangular coordinates robot 30 for grinding the outer surface of the spacer grid 1, a rectangular coordinates robot 40 for grinding a corner of the spacer grid 1, an automatic grinding wheel dressing unit 50 and a control unit 60.

The outer frame 10 defines a space for conducting a grinding operation. An outer end of the outer frame 10 has a profile made of aluminum, and a lower end thereof is made of a rectangular pipe. Four surfaces of the outer frame 10 are made of polycarbonate. It is desirable that the outer frame 10 be made of transparent material to enable a worker to observe the grinding operation conducted in the outer frame 10.

The spacer grid holding unit 20 includes a holding jig 21 on which the spacer grid 1 is seated and held, and a rotary index table 22 (refer to FIG. 4) which is coupled to the lower end of the holding jig 21 to rotate the holding jig 21.

The holding jig 21 is classified into various kinds of holding jigs according to a shape of the spacer grid. As shown in FIGS. 2 and 4, the holding jig 21 is basically configured such that a plurality of guide pins 21a protrudes upwards from a planar plate onto which the spacer grid 1 is seated. Thus, the holding jig 21 functions to position the spacer grid 1 stably at the correct position.

The rotary index table 22 (refer to FIG. 4) rotates the spacer grid 1, placed on the holding jig 21, to 90 degrees.

Furthermore, holders 23 and 23' for holding the spacer grid 1 placed on the holding jig 21 are disposed around the holding jig 21. The holders 23 and 23' are respectively coupled to air cylinders 24 and 24'. In detail, the holders 23 and 23' coupled to the air cylinders 24 and 24' are respectively provided at the side of the holding jig 21 and above the holding jig 21. Thus, when grinding the spacer grid 1, the holders 23 and 23' hold the spacer grid 1 to prevent it from moving undesirably. It is desirable that the holders 23 and 23' be made of material such as rubber, urethane, etc., having sufficient shock absorbing ability to prevent the spacer grid 1 from being damaged when the holders 23 and 23' come into contact with the spacer grid 1.

As shown in FIGS. 1 through 4, the rectangular coordinates robot 30 for grinding the outer surface of the spacer grid 1 is provided at a predetermined position adjacent to the spacer grid holding unit 20 and grinds protrusions 1a (refer to FIG. 5) formed on the outer surface of the spacer grid 1. The rectangular coordinates robot 30 includes a rotary plate 31, a rotary motor 33 and a moving unit 34. The rotary plate 31 is provided with a grinding wheel 32. Referring to FIGS. 1 and 2, the rotary motor 33 is coupled to the rotary plate 31 through a rotating shaft and thus rotates the rotary plate 31 at a predetermined speed. The moving unit 34 supports the rotary plate 31 and moves it in three axial directions.

The moving unit 34 (refer to FIGS. 1 and 2) includes a Y-axis guide rail 35, a Y-axis movable block 36, a Z-axis movable block 37 and an X-axis movable block 38. The Y-axis guide rail 35 is placed at a predetermined position adjacent to the spacer grid holding unit 20 and oriented in a lateral direction. The Y-axis movable block 36 moves in the lateral direction along the Y-axis guide rail 35 and includes a Z-axis guide rail 36a which extends to a predetermined length in the vertical direction. The Z-axis movable block 37 moves in the vertical direction along the Z-axis guide rail 36a of the Y-axis movable block 36. The X-axis movable block 38 moves in a longitudinal direction along an X-axis guide rail 37a which is provided on the front end of the Z-axis movable block 37. A drive motor (not shown) is provided in each movable block to provide driving force by which the movable block is moved in the corresponding direction. The rotary plate 31 and the rotary motor 33 are installed on the X-axis movable block 38.

Meanwhile, two kinds of sensors, that is, a grinding depth measuring sensor 51 and an outer strap height measuring sensor 52, are provided in the rectangular coordinates robot 30 for grinding the outer surface of the spacer grid 1. The sensors 51 and 52 are set such that when conducting the grinding operation, the repetitive positioning accuracy is within a range of ±0.01 mm or less.

Referring to FIGS. 1 and 2, the dressing unit 50 is installed at a position adjacent to the rotary plate 31. Thus, when the grinding ability of the grinding wheel 32 deteriorates due to abrasion, the dressing unit 50 automatically dresses the grinding wheel 32, measures the diameter of the grinding wheel 32, and then automatically applies a compensation value to a grinding program.

Referring to FIG. 1, the control unit 60 controls the spacer grid holding unit 20, the rectangular coordinates robot 30, the dressing unit 50 and the grinding program at the same time. The grinding program includes a main grinding program, a re-grinding program, an automatic dressing program, etc. according to a grinding mode.

Figure 5:
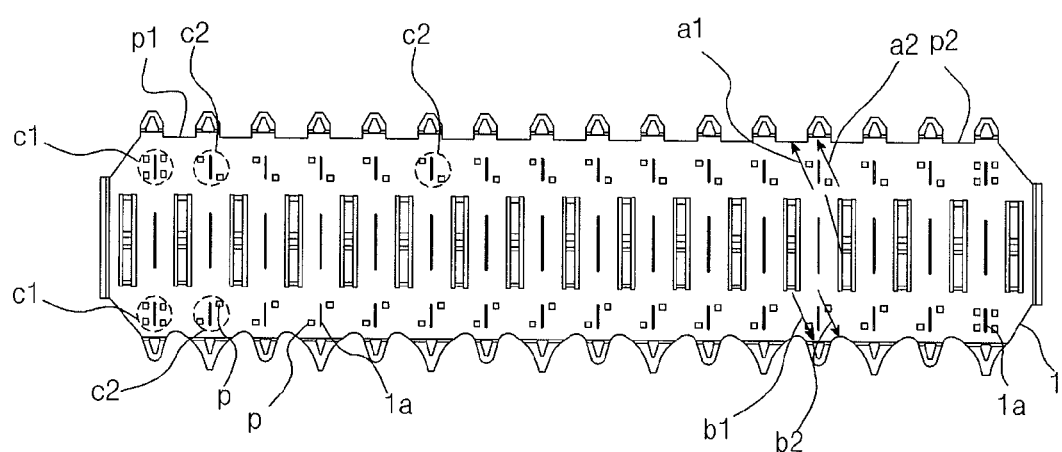
FIG. 5 is a front view of the spacer grid to illustrate portions to be measured by sensors and a method of grinding the spacer grid.
Figure 6:
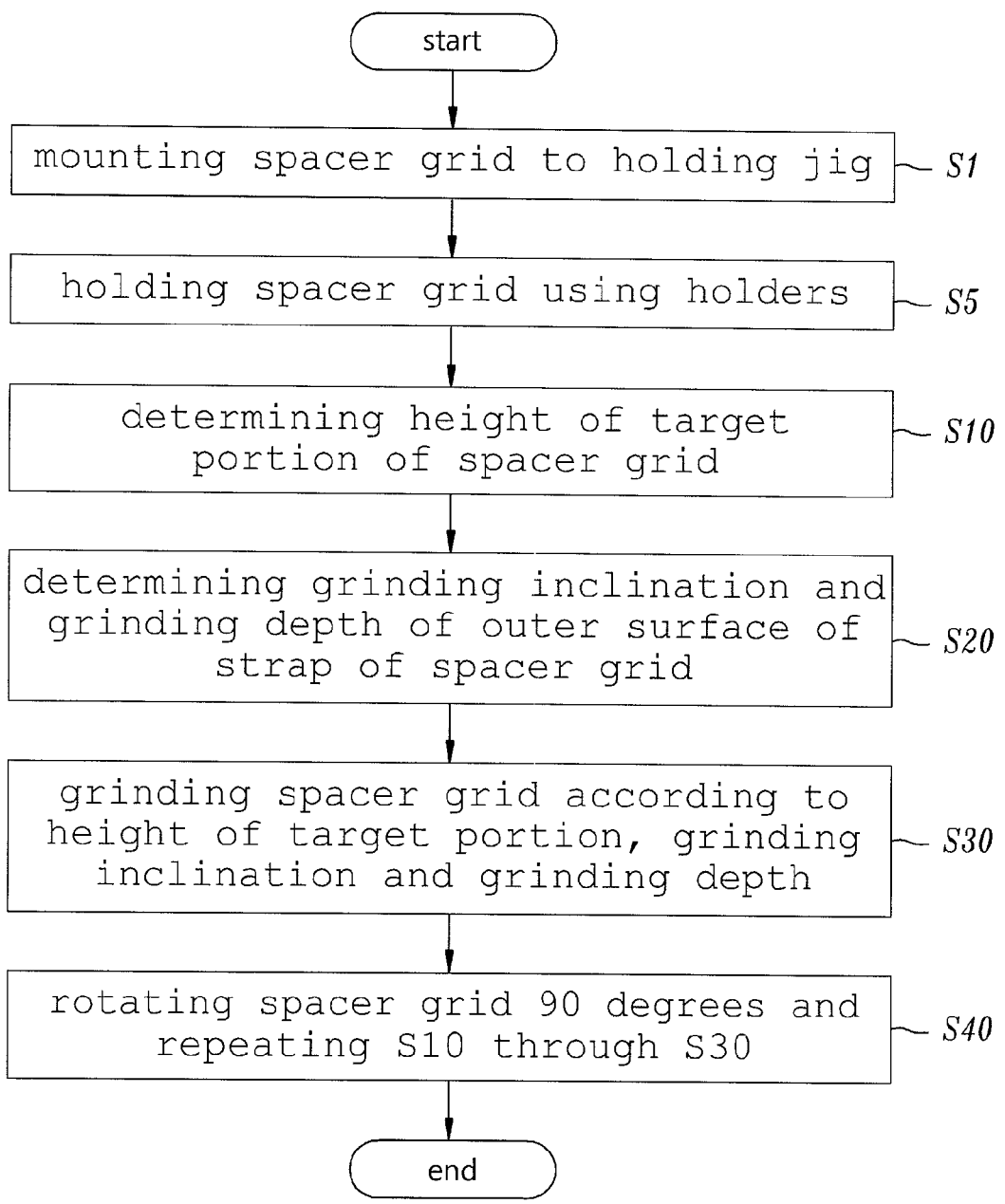
FIG. 6 is a flow chart showing a method of grinding the outer surface of the spacer grid of the nuclear fuel assembly according to the present invention.

The grinding program is generally set such that an operation of measuring a longitudinal inclination, an inclination of an outer surface, a grinding depth and, the grinding operation are conducted, as shown in FIGS. 5 and 6.

FIG. 5 is a front view of the spacer grid 1 to illustrate portions to be measured by sensors and a method of grinding the spacer grid 1. FIG. 6 is a flow chart showing a method of grinding the outer surface of the spacer grid 1 of the nuclear fuel assembly.

Hereinafter, the method of grinding the outer surface of the spacer grid 1 using the spacer grid grinding machine 100 will be explained with reference to FIGS. 1 through 6.

To conduct the process of grinding the outer surface of the spacer grid 1, the spacer grid 1 to be ground is mounted to the holding jig 21, at step S1. This step is a spacer grid mounting operation.

Thereafter, at step S5, the main grinding program is selected from among the programs and is conducted. Then, the upper and side air cylinders 24 and 24' are operated so that the holders 23 and 23' hold the spacer grid 1. This step is a spacer grid holding operation.

Subsequently, a target portion of an upper line of the spacer grid 1 is measured by the corresponding sensor and then is ground. A target portion of a lower line of the spacer grid 1 is measured by the corresponding sensor and then is ground. Here, the outer surface of the spacer grid 1 may be inclined in the longitudinal direction or be deformed in an uneven curved shape owing to an assembly allowable error.

Therefore, to grind the outer surface of the spacer grid 1 uniformly, as shown in FIGS. 5 and 6, a height of the upper surface of the spacer grid 1 and an inclination of the upper surface of the spacer grid 1 with respect to the longitudinal direction are measured in such a way as to bring the strap height measuring sensor 52 (refer to FIGS. 1 and 2) into contact with two measuring points p1 and p2 of an upper end of the outer strap of the spacer grid 1, at step S10. This step of measuring the height of the upper surface of the spacer grid 1 and the longitudinal inclination thereof is an operation for determining a height of a target portion to be ground.

Subsequently, the grinding depth measuring sensor 51 (refer to FIGS. 1 and 2) measures depths of four measuring points p and are in side cells c1 provided on upper and lower portions of opposite side walls of the spacer grid 1. An average of the depths of the two upper points is set as an upper depth. An average of the depths of the two lower points is set as a lower depth. The upper and lower depths that are measured with respect to the upper and lower side cells c1 of the opposite side walls of the spacer grid 1 are set as a depth of a grinding start point and a depth of a grinding end point according to the direction in which the spacer grid 1 is ground. Thereby, an inclination along which a depth of a grinding tool varies when grinding is set by a difference between the depths of the grinding start point and the grinding end point. In the present invention, as such, the grinding is conducted using the averages of the measured depth values, because a curved surface variation of the lateral corner areas of the spacer grid 1 is greater than that of other portions.

Meanwhile, in medial cells c2 which are formed in medial portions of the opposite side walls of the spacer grid 1 and each of which includes a protrusion 1a, grinding depths and grinding inclinations of medial cells c2 are measured in such a way that the sensor measures depths of two measuring points p which are disposed on opposite sides of the protrusion 1a and become a grinding start point and a grinding end point according to the grinding direction, at step S20. This step is an inclination and depth determining operation.

The grinding depth becomes a depth to which the grinding wheel 32 is controlled to eliminate the protrusions 1a such that the grinding wheel 32 comes into contact with the outer surface of the spacer grid 1 other than the protrusions 1*a*. The grinding inclination corresponds to a variation between the grinding start point and the grinding end point.

At step S30, after the grinding inclination and the grinding depth are determined, as shown by the arrows (a1 and a2 or b1 and b2) of FIG. 5, each portion is divided into two portions in the lateral direction to minimize the grinding depth before grinding. For example, as shown in FIG. 5, in response to the shape of the spacer grid 1, the upper protrusions 1*a* are ground upwards along the arrows a1 and a2, and the lower protrusions 1*a* are ground downwards along the arrows b1 and b2. Furthermore, because the protrusion may lean about five degrees, each protrusion 1*a* is ground in response to the shape thereof. This step is a grinding operation.

After the operation of grinding any one surface of the four surfaces of the spacer grid 1 is completed, the rotary index table 22 (refer to FIG. 4) rotates 90 degrees. Thereafter, the above-mentioned grinding operation is repeated. In this manner, the four surfaces of the spacer grid 1 are automatically ground, at step S40. This step is a target surface changing and grinding operation.

After the grinding operation is completed, the spacer grid 1 is removed from the holding jig 21 and then another spacer grid 1 to be ground is mounted to the holding jig 21.

Figure 7:
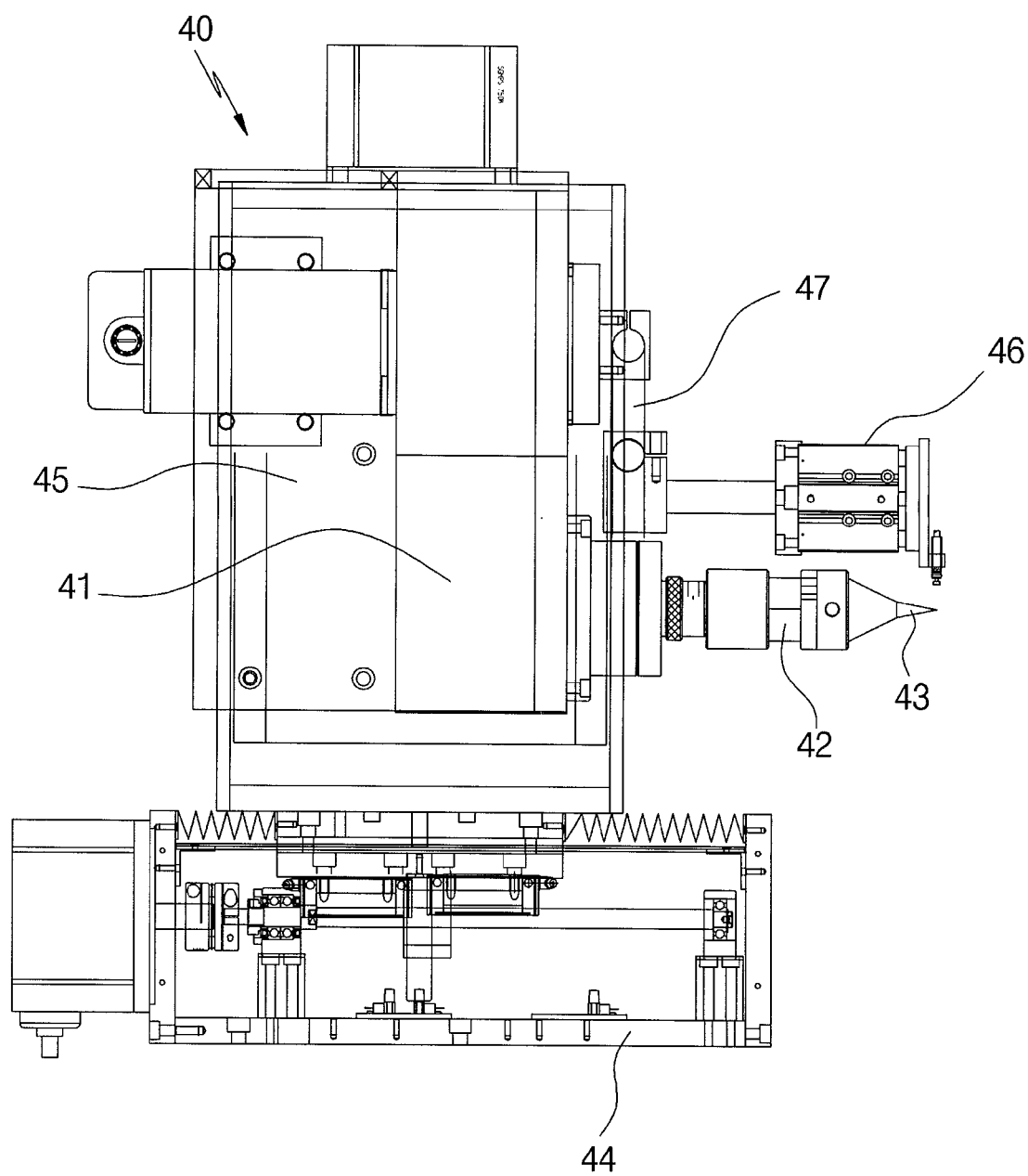
FIG. 7 is a front view of a rectangular coordinates robot of FIG. 1 for grinding a corner of the spacer grid.
Figure 8:
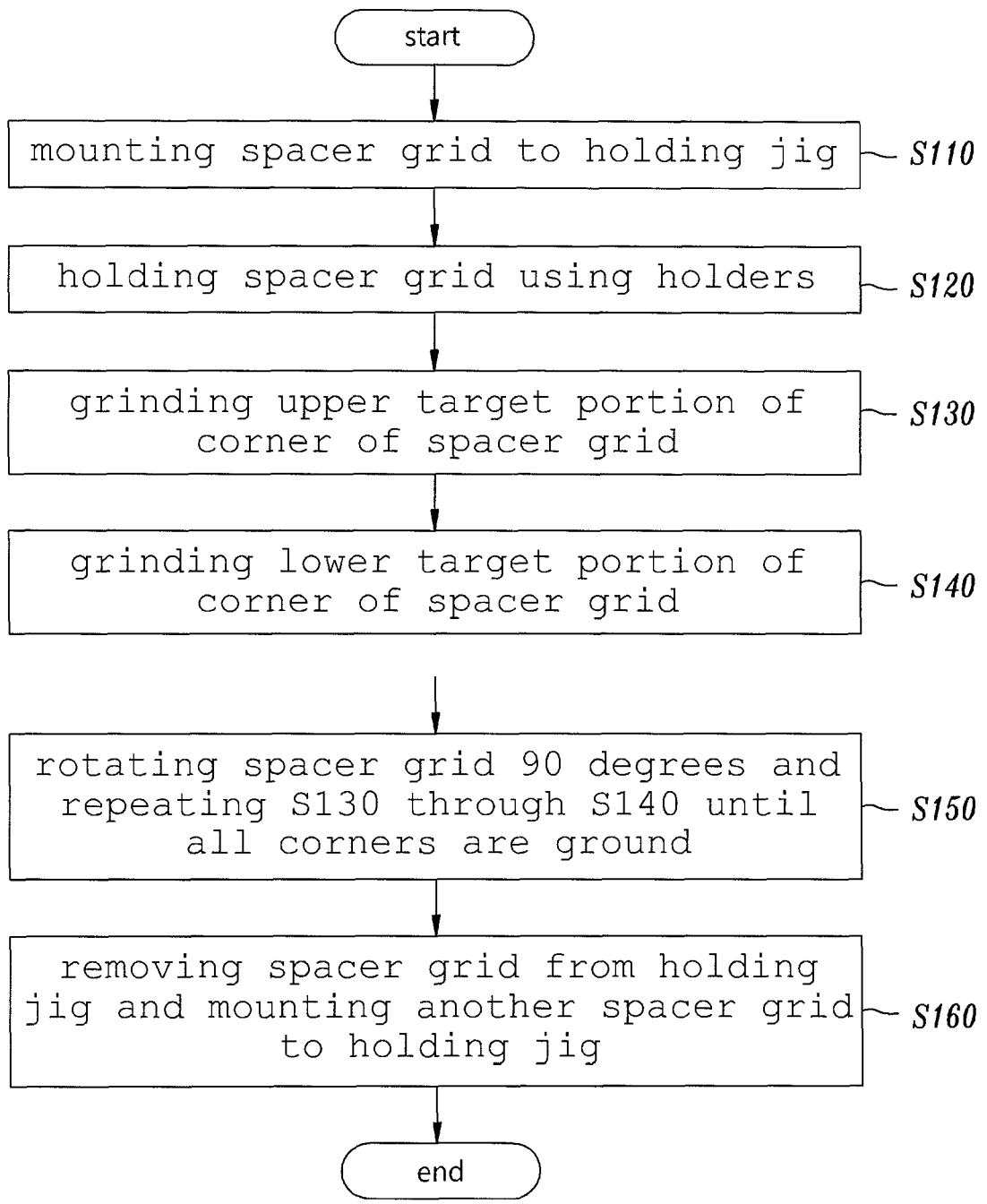
FIG. 8 is a flow chart showing a method of grinding the corner of the spacer grid of the nuclear fuel assembly according to the present invention.

FIG. 7 is a front view of a rectangular coordinates robot 40 of FIG. 1 for grinding the corner of the spacer grid 1. FIG. 8 is a flow chart showing a method of grinding the corner of the spacer grid 1 of the nuclear fuel assembly.

As shown in FIGS. 1 and 7, the rectangular coordinates robot 40 is provided at a position adjacent to the spacer grid holding unit 20 and grinds protrusions formed on the corner of the spacer grid 1. The rectangular coordinates robot 40 includes a robot body 41, a grinding tool 42 and a grinding tip 43. The robot body 41 is provided on a guide rail unit 44 so as to be movable towards or away from the holding jig 21 (refer to FIG. 1) and is coupled to a lift block 45 so as to be liftable. The grinding tool 42 is coupled to the robot body 41 and grinds the corner of the spacer grid 1. The grinding tip 43 is removably coupled to the front end of the grinding tool 42. The grinding tip 43 is tapered such that the thickness thereof is reduced from the proximal end to the distal end. A transfer motor (not shown) and a lift motor (not shown) are respectively installed in the guide rail unit 44 and the lift block 45 to provide drive force for moving the rectangular coordinates robot 40 in the horizontal direction and the vertical direction.

The rectangular coordinates robot 40 further includes a sensor module 46 which measures the height of the spacer grid 1 to grind correctly the upper corner and the lower corner of the spacer grid 1. The sensor module 46 is provided on one end of a support arm 47 which is rotatably coupled to the robot body 41.

The rectangular coordinates robot 40 is also operated under the control of the control unit 60.

The method of grinding the corner of the spacer grid 1 will be described in detail with reference to FIGS. 7 and 8.

At step S110, the spacer grid 1 to be ground is mounted to the holding jig 21. This step is a spacer grid mounting operation.

At step S120, the main grinding program is selected from among the programs and is conducted. Then, the upper and side air cylinders 24 and 24' are operated so that the holders 23 and 23' hold the spacer grid 1. This step is a spacer grid holding operation.

Thereafter, at step S130, the height of the upper portion of the corner of the spacer grid 1 is measured using the sensor module 46, and then the upper portion of the corner of the spacer grid 1 is repetitively ground by 0.25 mm each time using the rectangular coordinates robot 40. This step is an upper corner grinding operation.

After the operation of grinding the upper portion of the corner of the spacer grid 1 is completed, the rectangular coordinates robot 40 moves downwards by preset design measurements, such as a width of the strap, a distance between the protrusions, etc., and repetitively grinds by 0.25 mm each time using a lower portion of the corner of the spacer grid 1 to a preset depth along an inclination that is measured during the upper corner grinding operation, at step S140. This step is a lower corner grinding operation.

After the grinding of one side of the spacer grid 1 is completed, the spacer grid 1 is automatically rotated 90 degrees. The operations from step S120 to step S140 are conducted again to grind upper and lower portions of the corresponding corner. This process is repeated until all four sides of the spacer grid 1 are completely ground, at step S150. This step is a target corner changing and grinding operation.

After the grinding operation is completed, the spacer grid 1 is removed from the holding jig 21. Subsequently, another spacer grid 1 to be ground is mounted to the holding jig 21, at step 160.

The grinding machine 100 according to the present invention may be configured such that the processes of grinding the outer surface and corners of the spacer grid 1 are conducted at once in such a manner that the operations from step S130 to step S140 of the corner grinding process of FIG. 8 are conducted before step S10 or between steps S30 and S40 of the outer surface grinding process of FIG. 6 without conducting the operations from step S110 to step S120.

In the case of this grinding machine 100, because the processes of grinding the outer surface and corners of the spacer grid 1 can be conducted simultaneously, the productivity can be markedly enhanced. Furthermore, the quality of the produced spacer grids 1 can be increased, because portions to be ground are uniformly processed. In addition, thanks to automation, improvement in the productivity, quality and working surroundings can be realized, so that the production process can be optimized.

Moreover, the outer frame 10 can markedly reduce noise and dust generated when conducting the grinding operation, thus improving the working surroundings, thereby preserving the health of workers.

As described above, in the present invention, an operation for grinding an outer surface or corner of a spacer grid 1 can be automatically conducted by a single process. Therefore, the productivity can be enhanced. Furthermore, noise and dust can be markedly reduced, improving work surroundings, and preventing a worker from contracting a disease which may be induced by the grinding operation.

In addition, the present invention can uniformly grind target portions, thus enhancing the quality of the spacer grid 1. Moreover, in the present invention, because the grinding operation can be automated, the improvement in the productivity, quality and working surroundings can be realized. As a result, conditions of the production process can be optimized.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A machine for grinding a spacer grid of a nuclear fuel assembly, comprising:
 a spacer grid holding unit directly holding a spacer grid on grinding operation and including:

a holding jig on which the spacer grid is seated and held;
a rotary index table being coupled to a lower end of the holding jig and rotating the holding jig;
a first holder installed beside the holding jig, operated by a first air cylinder and holding the spacer grid from a side of the spacer grid; and
a second holder operated by a second air cylinder and holding the spacer grid from a to of the spacer grid;
a first rectangular coordinates robot for grinding a lateral side of the spacer grid on the spacer grid holding unit, the first rectangular coordinates robot positioned beside the spacer grid holding unit and including:
a moving unit moving in three-axial directions;
a rotary motor installed on the moving unit;
a rotary plate supported by the moving unit and coupled on a shaft of the rotary motor; and
a grinding wheel provided on the rotary plate;
a second rectangular coordinates robot for grinding a corner of the spacer grid on the spacer grid holding unit, the second rectangular coordinates robot positioned beside the spacer grid holding unit and including:
a guide rail unit movable towards or away from the holding jig in horizontal direction;
a lift block movable in vertical direction on the guide rail unit;
a second robot body coupled to the lift block;
a grinding tool coupled to the second robot body; and
a grinding tip removably coupled to a front end of the grinding tool; and
a control unit controlling the machine to conduct an operation for grinding the spacer grid.

2. The machine as set forth in claim 1, wherein the holding jig comprises:
a planar plate on which the spacer grid is seated; and
a plurality of guide pins protruding upwards from the planar plate.

3. The machine as set forth in claim 1, wherein the first rectangular coordinates robot further comprises:
a first measuring sensor configured to measure a depth of four measuring points provided in sidewalls of the spacer grid; and
a second measuring sensor configured to measure a height of an outer strap of the spacer grid.

4. The machine as set forth in claim 1, further comprising:
an automatic dressing unit provided in the first rectangular coordinates robot or at a predetermined position adjacent to the first rectangular coordinates robot to dress the grinding wheel, measuring a diameter of the grinding wheel and utilizing the measured diameter for controlling the first rectangular coordinates robot.

5. The machine as set forth in claim 1, wherein the second rectangular coordinates robot further comprises:
a sensor module being provided at a predetermined position on the robot body and being configured to sense a position at which the spacer grid is ground.

6. A method of grinding an outer surface of a spacer grid of a nuclear fuel assembly, comprising:
mounting the spacer grid onto a holding jig to conduct a grinding operation;
holding the spacer grid using holders by operating an upper cylinder and a side cylinder, the holders being respectively coupled to the upper cylinder and the side cylinder;
determining a height of a target portion to be ground and an inclination of the target portion by measuring heights of opposite ends of an upper surface of an outer strap of the spacer grid using a sensor;
determining a grinding depth and an inclination with respect to a grinding direction by measuring depths of four measuring points of each of four side cells that are respectively provided on upper and lower portions of opposite ends of the spacer grid and by measuring depths of two measuring points of each of a plurality of medial cells that are disposed in a medial portion of the spacer grid, the two measuring points corresponding to a grinding start point and a grinding end point;
grinding the outer surface of the spacer grid in response to at least one of the height of the target portion of the spacer grid, the inclination of the outer surface of the spacer grid and the grinding depth;
rotating the spacer grid after the grinding is completed, so that another outer surface of the spacer grid is disposed at a position at which the outer surface of the spacer grid is ground; and
repeating the determining of the height of the target portion, the determining of the grinding depth and the inclination with respect to the grinding direction, the grinding, and the rotating, until all four surfaces of the spacer grid are ground.

7. The method as set forth in claim 6, wherein the determining of the grinding depth and the inclination with respect to the grinding direction comprises:
measuring depths of the four measuring points in each of the side cells at opposite positions with respect to diagonal directions;
calculating an average of an upper two measuring points of the four measuring points and an average of a lower two measuring points of the four measuring points; and
setting the average of the upper two measuring points and the average of the lower two measuring points as a grinding start point and a grinding end point.

8. A method of grinding a corner of a spacer grid of a nuclear fuel assembly, comprising:
mounting the spacer grid onto a holding jig to conduct a grinding operation;
holding the spacer grid using holders by operating an upper cylinder and a side cylinder, the holders being respectively coupled to the upper cylinder and the side cylinder;
grinding an upper portion of the corner of the spacer grid, including measuring a height of an upper end of the corner of the spacer grid using a sensor module;
repetitively grinding the upper portion of the corner to a measured depth along a measured inclination by a preset depth each time using a rectangular coordinates robot for grinding the corner;
grinding a lower portion of the corner of the spacer grid, including moving the rectangular coordinates robot towards the lower portion of the corner by a selected distance;
repetitively grinding the lower portion of the corner to a measured depth by a preset depth each time using the rectangular coordinates robot along the inclination determined during the grinding of the upper portion of the corner;
rotating the spacer grid after the grinding of the upper and lower portions of one corner of the spacer grid is completed; and
repeating the grinding of the upper portion of the corner, the grinding of the lower portion of the corner, and the rotating of the spacer grid, until all corners of the spacer grid are ground.

9. A machine for grinding a spacer grid of a nuclear fuel assembly, comprising:

a spacer grid holding unit including a holding jig onto which the spacer grid is seated and held;

a rotary index table being coupled to a lower end of the holding jig and rotating the holding jig;

a first rectangular coordinates robot for grinding an outer surface of the spacer grid and being provided at a predetermined position adjacent to the spacer grid holding unit;

a second rectangular coordinates robot for grinding a corner of the spacer grid and being provided at a predetermined position adjacent to the spacer grid holding unit;

an automatic dressing unit provided in the first rectangular coordinates robot or at a predetermined position adjacent to the first rectangular coordinates robot to dress the grinding wheel, and a control unit controlling the spacer grid holding unit, the first rectangular coordinates robot, the second rectangular coordinates robot, and the automatic dressing unit to conduct an operation for grinding the spacer grid;

wherein the holding jig comprises:
  a planar plate onto which the spacer grid is seated; and
  a plurality of guide pins protruding upwards from the planar plate, wherein holders are respectively provided above and beside the holding jig, each of the holders being coupled to an air cylinder, whereby the holders hold the spacer grid when the operation for grinding the spacer grid is conducted, wherein the first rectangular coordinates robot comprises:
  a rotary plate provided with a grinding wheel;
  a rotary motor being coupled to the rotary plate through a rotating shaft and rotating the rotary plate at a predetermined speed;
  a first measuring sensor configured to measure a depth to which the spacer grid is ground; and
  a second measuring sensor configured to measure a height of an outer strap of the spacer grid, wherein the second rectangular coordinates robot comprises:
  a robot body being provided on a guide rail unit so as to be movable towards or away from the holding jig and being coupled to a lift block so as to be liftable;
  a grinding tool coupled to the robot body and configured to grind the corner of the spacer grid;
  a grinding tip being removably coupled to a front end of the grinding tool and being tapered such that a thickness thereof is reduced towards a distal end thereof; and
  a sensor module being provided at a predetermined position on the robot body and being configured to sense a position at which the spacer grid is ground.

* * * * *